United States Patent Office 3,145,234
Patented Aug. 18, 1964

3,145,234
ORGANIC PHOSPHINE DERIVATIVES AND
METHODS OF PREPARING SAME
Sheldon A. Buckler and Martin Epstein, Stamford, Conn.,
assignors to American Cyanamid Company, New York,
N.Y., a corporation of Maine
No Drawing. Filed July 1, 1959, Ser. No. 824,169
10 Claims. (Cl. 260—606.5)

The present invention relates to the preparation of novel organophosphorus primary oxides. In particular, the instant discovery is concerned with a single-step process for producing these oxides.

Heretofore, it was found that phosphonous acids ($RPO_2H_2$) resulted upon the oxidation of primary phosphines with air. See Kosolapoff, "Organophosphorus Compounds," 1950, page 23, which states unequivocally that "The lowest oxidation products of primary phosphines that have been isolated are the phosphonous acids, $RPO_2H_2$ . . ."

According to the present invention, however, it has been discovered that primary oxides may be readily prepared by subjecting an organic primary phosphine to the oxidizing action provided by hydrogen peroxide, t-butyl hydroperoxide, or the like, in an inert atmosphere, such as an atmosphere of nitrogen, $CO_2$, or the like.

From the Kosolapoff teaching noted above, and other teachings in the art, it would be expected that by subjecting the primary phosphines contemplated herein to the action of an oxidizing agent a phosphonous acid would be the inevitable result. On the contrary, a straightforward route to novel primary phosphine oxides has been discovered. It is advantageous to carry out the reaction in an inert organic solvent medium, such as a monohydric alcohol, benzene, or the like.

Pursuant to a particular embodiment of the instant discovery, 2-cyanoethylphosphine is admixed with methyl alcohol and the resulting mixture intermingled with a predetermined amount of hydrogen peroxide. The reaction is carried out in an atmosphere of nitrogen and at a temperature of about 0° C. Subsequent to the reaction the resulting mixture is evacuated at reduced pressure to give 2-cyanoethylphosphine oxide.

The primary phosphine oxides contemplated herein may be characterized by the formula

wherein R is a member selected from the group consisting of alkyl ($C_1$-$C_{18}$), substituted and unsubstituted, saturated and unsaturated, branched and straight chain; cycloalkyl; aralkyl, substituted and unsubstituted, alkaryl, substituted and unsubstituted; and aryl, substituted and unsubstituted.

Typical primary phosphine reactants, $RPH_2$, wherein R is the same as above, useful for preparing the oxides of the instant discovery are phenylphosphine, cyclohexylphosphine, dodecylphosphine, isopropylphosphine, allylphosphine, 2-hydroxyethylphosphine, benzylphosphine, para-chlorophenylphosphine, methylphosphine, isobutylphosphine, 2-carboethoxyethylphosphine, and the like. It follows from the above listing that typical substituents within the purview of the present invention are nitrile, alkoxy, halogen, hydroxy, carboxy, and the like.

Among the oxidizing agents useful herein are hydrogen peroxide, tertiary-butyl hydroperoxide, dinitrogen tetroxide, benzoyl peroxide, iodine, chlorine, sodium hypochlorite, nitric acid, potassium permanganate, chromic acid, and the like. As pointed out above, very desirable results are obtained by carrying out the reaction in an inert organic solvent medium, such as benzene, chloroform, hexane, ether, ethyl acetate, monohydric alcohols, or the like.

Preferably, reaction is carried out at a temperature in the range of —10° C. to 20° C. However, substantially higher and lower temperatures on the order of —50° C. to 60° C. are effective.

Likewise, while it is desirable to operate at atmospheric pressure, pressures on the order of 1 to 50 atmospheres are suitable. If desired, also, sub-atmospheric pressures may be employed, such as 0.5 atmosphere or less.

Preferably, about one equivalent of oxidizing agent per mole of phosphine is used. However, from about 0.1 to about 2 equivalents may be employed, but not without diminishing the yield proportionately.

As indicated above, best results are obtained by carrying out the reaction in an inert gaseous atmosphere, such as an atmosphere of $CO_2$, $N_2$, helium, argon, $H_2$, and the like.

The process contemplated herein may be carried out batchwise, continuously or semi-continuously. In addition, the reactants may be brought together in numerous ways. For example, the primary phosphine may be added to the oxidizing agent or separate flows of these reactants may be made to intermingle by tangential or countercurrent contact. As shown above, dispersing the primary phosphine in an inert organic solvent and admixing therewith an oxidizing agent which, in turn, is in a similar solvent medium provides very desirable results. In fact, the oxidizing agent is preferably introduced into the phosphine reactant.

The products for the present invention are useful as sequestering agents for selectively removing metal ions from mixtures containing same. For example, uranyl values can be selectively leached from mineral ores containing same by employing the novel products of the present invention in techniques known in the art, as shown by Blake et al. in the Atomic Energy Commission Report ORNL-1903, May 13, 1955.

The instant discovery will best be understood by reference to the following illustrative examples:

EXAMPLE I

*2-Cyanoethylphosphine Oxide*

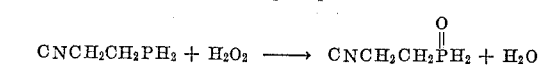

A solution of 6.35 grams (0.073 mole) of 2-cyanoethylphosphine in 40 milliliters of methyl alcohol is placed in a 3-necked flask equipped with a stirrer, addition funnel, and a nitrogen inlet. An atmosphere of nitrogen is maintained throughout the preparation. The solution is cooled to 0° C. and a mixture of 8.25 grams (0.073 mole) of 30 percent by weight hydrogen peroxide and 10 milliliters of methanol is added continuously in the course of 1 hour with stirring. The resulting product solution is then evaporated in a nitrogen atmosphere at reduced pressure to give 2-cyanoethylphosphine oxide as a colorless liquid.

EXAMPLE II

*Phenylphosphine Oxide*

The procedure of Example I, above, is repeated using 7.87 grams (0.073 mole) of phenylphosphine. The product is phenylphosphine oxide.

EXAMPLE III

*Cyclohexylphosphine Oxide*

The procedure of Example I, above, is repeated using 8.25 grams (0.073 mole) of cyclohexylphosphine. The product is cyclohexylphosphine oxide.

EXAMPLE IV

Octylphosphine Oxide

The procedure of Example I, above, is repeated using 10.7 grams (0.073 mole) of octylphosphine. The product is octylphosphine oxide.

EXAMPLE V

Allylphosphine Oxide

The procedure of Example I, above, is repeated using 5.40 grams (0.073 mole) of allylphosphine. The product is allylphosphine oxide.

EXAMPLE VI

Benzylphosphine Oxide

The procedure of Example I, above, is repeated using 9.05 grams (0.073 mole) of benzylphosphine. The product is benzylphosphine oxide.

EXAMPLE VII para-Methylphenylphosphine Oxide

The procedure of Example I, above, is repeated using 9.05 grams (0.073 mole) of para-methylphenylphosphine. The product is para-methylphenylphosphine oxide.

EXAMPLE VIII para-Chlorophenylphosphine Oxide

The procedure of Example I, above, is repeated using 10.5 grams (0.073 mole) of para-chlorophenylphosphine. The product is para-chlorophenylphosphine oxide.

EXAMPLE IX

Octylphosphine Oxide $$CH_3(CH_2)_7PH_2 + t\text{-}C_4H_9OOH \longrightarrow CH_3(CH_2)_7\overset{O}{\underset{\|}{P}}H_2 + t\text{-}C_4H_9OH$$

A solution of 14.6 grams (0.1 mole) of octylphosphine in 60 milliliters of alcohols is placed in the apparatus described in Example I, above. A solution of 9.0 grams (0.1 mole) of t-butylhydroperoxide in 10 milliliters of alcohol is added continuously to the primary phosphine solution in the course of 45 minutes and in the manner of Example I. The resulting product solution is evaporated in a nitrogen atmosphere at a reduced pressure to give octylphosphine oxide as a colorless liquid.

EXAMPLE X

Isopropylphosphine Oxide

The procedure of Example IX, above, is repeated using 7.61 grams (0.1 mole) of isopropylphosphine. The product is isopropylphosphine oxide.

EXAMPLE XI

Dodecylphosphine Oxide $$2CH_3(CH_2)_{11}PH_2 + N_2O_4 \longrightarrow 2CH_3(CH_2)_{11}\overset{O}{\underset{\|}{P}}H_2 + 2NO$$

A solution of 20.2 grams (0.1 mole) of dodecylphosphine in 80 milliliters of chloroform is prepared and a solution of 4.60 grams (0.05 mole) of dinitrogen tetroxide in 50 milliliters of chloroform is added to it continuously with stirring at 0° C. in the apparatus and in the manner described in Example I, above. After evaporating the volatile materials, dodecylphosphine oxide is obtained as a liquid residue.

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

We claim:
1. 2-cyanoethylphosphine oxide.
2. A method of preparing an organophosphorus primary oxide corresponding to the formula

$$R\overset{O}{\underset{\|}{P}}H_2$$

wherein R is a member selected from the group consisting of alkyl, substituted and unsubstituted, branched and straight chain; alkenyl; cycloalkyl; alkaryl; benzyl; and phenyl, substituted and unsubstituted; said alkyl and alkenyl having from 1 to 18 carbon atoms, and said substituents for alkyl and phenyl being selected from the group consisting of nitrile, alkoxy, hydroxy and carboxy, which comprises bringing together in intimate contact and in an inert atmosphere and at a temperature in the range of −50° C. to 60° C. a primary phosphine of the formula $RPH_2$, wherin R is the same as above, and an oxidizing agent selected from the group consisting of hydrogen peroxide, an organic hydroperoxide and dinitrogen tetroxide, said oxidizing agent being present in the ratio of 0.1 to 2 molar equivalents per mole of phosphine reactant, and recovering the corresponding primary phosphine oxide.

3. The process of claim 2 in which the reaction is carried out in the presence of an inert organic solvent.

4. The process of claim 2 wherein the primary phosphine is 2-cyanoethylphosphine.

5. The process of claim 2 wherein the primary phosphine is cyclohexylphosphine.

6. The process of claim 2 wherein the primary phosphine is octylphosphine.

7. The process of claim 2 wherein the primary phosphine is isopropylphosphine.

8. The process of claim 2 wherein the reactants are present in about equimolar amounts.

9. The process of claim 2 wherein the reactants are brought together at a temperature in the range of −10° C. to 20° C.

10. The process of claim 2 wherein the primary phosphine is allylphosphine.

References Cited in the file of this patent

UNITED STATES PATENTS

| | | |
|---|---|---|
| 2,138,835 | Butz | Dec. 6, 1938 |
| 2,584,112 | Brown | Feb. 5, 1951 |
| 2,892,305 | Zletz | June 30, 1959 |
| 2,953,596 | Rauhut et al. | Sept. 20, 1960 |
| 2,957,931 | Hamilton et al. | Oct. 25, 1960 |

OTHER REFERENCES

Lang: Handbook of Chemistry, 6th ed., 1946, page 604, TP151H25.